United States Patent [19]

Miyashita

[11] 4,454,571

[45] Jun. 12, 1984

[54] CIRCUIT FOR GENERATING A SUBSTRATE BIAS VOLTAGE

[75] Inventor: Takumi Miyashita, Inagi, Japan

[73] Assignee: Fujitsu Limited, Kawasaki, Japan

[21] Appl. No.: 392,076

[22] Filed: Jun. 25, 1982

[30] Foreign Application Priority Data

Jun. 29, 1981 [JP] Japan ................................ 56-101125

[51] Int. Cl.³ ................................................ H02M 3/18

[52] U.S. Cl. ...................................... 363/60; 363/147; 307/200 B; 307/296 R; 307/304

[58] Field of Search .................................... 363/59–62, 363/126–127, 147; 307/200 B, 246, 247 R, 279, 296 R, 297, 304

[56] References Cited

U.S. PATENT DOCUMENTS

| | | | |
|---|---|---|---|
| 3,944,908 | 3/1976 | Oki | 363/60 |
| 4,045,719 | 8/1977 | Salzer | 307/246 X |
| 4,068,295 | 1/1978 | Portmann | 363/60 |
| 4,115,710 | 9/1978 | Lou | 307/304 |
| 4,378,506 | 3/1983 | Taira | 307/304 X |

*Primary Examiner*—Peter S. Wong
*Attorney, Agent, or Firm*—Staas & Halsey

[57] ABSTRACT

An oscillator circuit which generates a periodic signal is connected to an input side of a capacitor and the output side of the capacitor is connected via a rectifier circuit to a semiconductor substrate and also to a reference voltage potential. The characteristic feature of the present invention is to provide a current limiting circuit which limits the peak value of the current which flows in the capacitor when the rectifier circuit is placed in the conductive state.

9 Claims, 13 Drawing Figures

CIRCUIT FOR GENERATING A SUBSTRATE BIAS VOLTAGE

BACKGROUND OF THE INVENTION

The present invention relates to a circuit for generating a substrate bias voltage, more especially to a substrate-bias-voltage-generating circuit which prevents malfunctions of the circuits arranged near by due to unavoidable forward biasing of a pn junction in the substrate-bias-voltage-generating circuit during operation and the resultant injection of minority carriers to the semiconductor substrate.

Recent semiconductor integrated circuits tend to be operated by a single source, such as +5 V. Semiconductor memory devices, however, sometimes require negative direction bias voltage. In such cases, the semiconductor integrated circuit is provided with a substrate-bias-voltage-generating circuit which forms negative direction bias voltage from the +5 V source.

For example, semiconductor integrated circuit devices (IC's) formed by n channel insulated gate field effect transistor's (MIS FET's) have the capacitance decreased in the pn junction formed between the MIS FET source region and drain region and the semiconductor substrate. This increases circuit operating speed and the MIS FET threshold voltage is controlled within the desired value by the application, to the semiconductor substrate forming the MIS FET, of a substrate bias voltage having a polarity which reverse biases the pn junction, for example, in an n channel metal-oxide semiconductor (MOS) IC, i.e., a substrate bias voltage of negative polarity. Such substrate bias voltage is given a polarity opposite to the electric source voltage supplied to the IC.

When forming said substrate-bias-voltage-generating circuit, however, the formation of the necessary semiconductor rectifier circuit, for example, an enhancement type channel FET on the semiconductor substrate inevitably results in the formation of a junction diode between the FET source and drain and the semiconductor substrate and, thereby, minority carriers are injected into the semiconductor substrate. This results in malfunctions in the circuits arranged near the substrate-bias-voltage-generating circuit.

SUMMARY OF THE INVENTION

An object of the present invention is to control the current which flows in the above-mentioned junction diode to a level able to prevent malfunctions of peripheral circuits.

Another object of the present invention is to provide a substrate-bias-voltage-generating circuit able to maintain its function even if the above-mentioned junction diode is formed.

The above-mentioned objects can be achieved by a substrate-bias-voltage-generating circuit in a semiconductor substrate comprising: means for providing a reference voltage level; first and second rectifier circuits; a capacitor having first and second terminals, the first terminal being connected via the first rectifier circuit to the semiconductor substrate and connected via the second rectifier circuit to a reference voltage level; an oscillator circuit which generates a periodic signal; a drive circuit including a positive direction drive circuit which receives the output of the oscillator circuit and which forwardly drives the second terminal of the capacitor and a negative direction drive circuit which receives the output of the oscillator circuit and which reversely drives the other terminal of the capacitor element; and a current limiting circuit for limiting the peak valve of the current in the capacitor when the first rectifier circuit is placed in the conductive state.

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1:
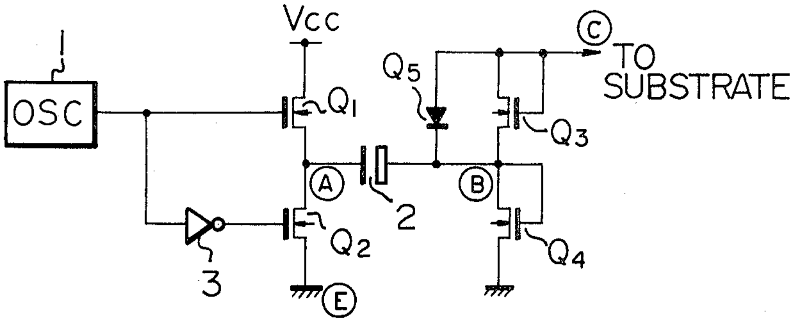
Fig. 1 (PRIOR ART)
FIG. 1 is a block diagram of one example of a conventional substrate-bias-voltage-generating circuit.

FIG. 1 illustrates a conventional substrate-bias-voltage-generating circuit. In FIG. 1, reference numeral 1 denotes an oscillator circuit, 2 is a capacitor, 3 is an inverter, $Q_1$, $Q_2$, $Q_3$, and $Q_4$ are MOS transistors, A and B are points of reference for FIG. 3, C is an output terminal, and E is ground.

Figure 2:
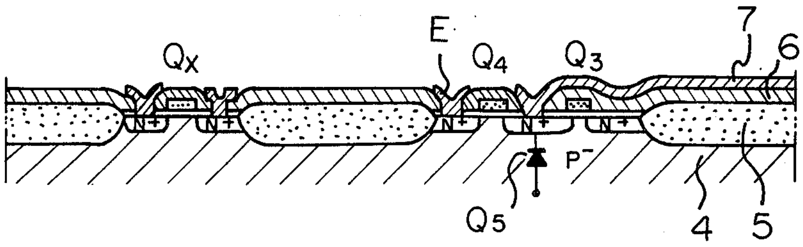
Fig. 2 (PRIOR ART)
FIG. 2 is a sectional view of the construction of the circuit shown in FIG. 1.
Figure 3:
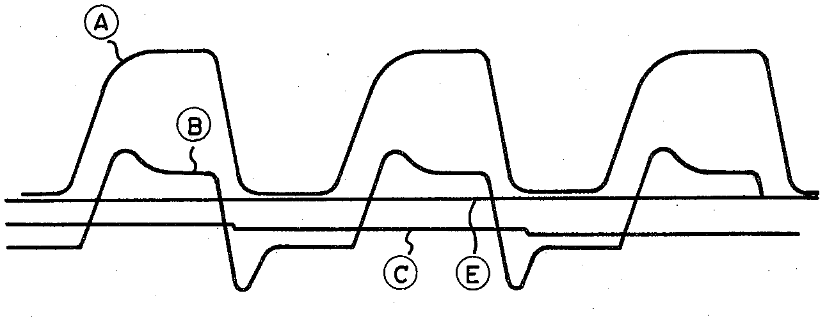
Fig. 3 (PRIOR ART)
FIG. 3 is a diagram of waveforms in essential portions of the circuit shown in FIG. 1.

FIG. 2 is a sectional view showing the relation between MOS transistors of the substrate-bias-voltage-generating circuit, a junction diode and a transistor in a peripheral circuit near the substrate-bias-voltage-generating circuit. In FIG. 2, reference numeral 4 denotes a p type semiconductor substrate, 5 is silicon dioxide, 6 is an insulation film, 7 is a wire layer, $Q_3$ and $Q_4$ are the MOS transistors of the substrate-bias-voltage-generating circuit, $Q_x$ is the transistor in the peripheral circuit, and E is ground. FIG. 3 illustrates the relation between voltage waveform points A and B in FIG. 1, a substrate bias voltage level at point C, and ground potential at point E.

In FIG. 1, the oscillator circuit 1 generates a square wave signal. The output of the oscillator circuit 1 is applied directly, or via inverter 3, to the gates of MOS transistors $Q_1$ and $Q_2$. A high output of the oscillator circuit 1 places MOS transistor $Q_1$ in the ON state and MOS transistor $Q_2$ in the OFF state, thereby placing the diode-connected MOS transistor $Q_4$ in the ON state, connected via capacitor 2 to connection points of MOS transistor $Q_1$ and $Q_2$, and charging the capacitor 2.

A low output of the oscillator circuit 1 places MOS transistor $Q_1$ in the OFF state and MOS transistor $Q_2$ in the ON state, thereby discharging capacitor 2 and placing MOS transistor $Q_4$ in the OFF state. This lowers the potential at point B. When the potential at point B falls below the value of the potential at output terminal C minus the threshold voltage of MOS transistor $Q_3$ the diode-connected MOS transistor $Q_3$ is in the ON state. This discharges capacitor 2 and the discharged current flows from the drain to the source of MOS transistor $Q_3$, thereby causing a lower voltage than ground potential to be generated at output terminal C. Thus, capacitor 2 and MOS transistors $Q_3$ and $Q_4$ for a substrate-bias-voltage-generating circuit.

In the circuit shown in FIG. 1, the flow of current through MOS transistors $Q_2$ and $Q_3$ generates a peak voltage as shown in FIG. 3. MOS transistor $Q_3$ cannot handle all the current. The current thereupon flows through the undesirably formed diode $Q_5$ and causes injections of minority carriers to the substrate. In this condition, any transistor, such as $Q_x$ shown in FIG. 2, memory cell, or circuit, carrying out dynamic operation near the substrate-bias-voltage-generating circuit has its information inverted by minority carriers. This problem is especially serious in a low temperature state where the life of minority carriers is long. This problem can be eliminated by the embodiment of the present invention described hereinafter.

Figure 4A:
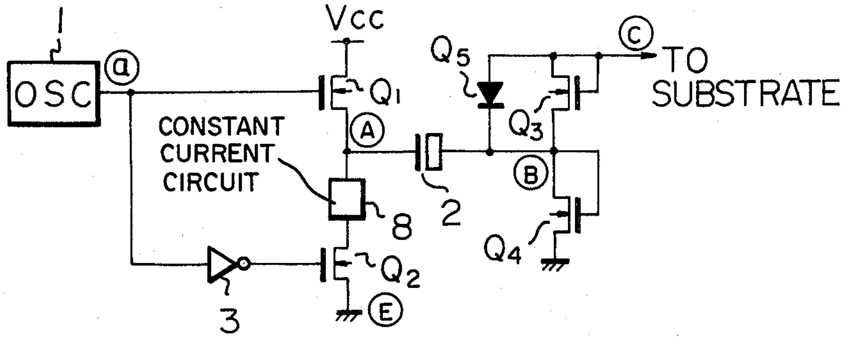
FIGS. 4A and 4B are block diagrams of one embodiment of a substrate-bias-voltage-generating circuit according to the present invention.
Figure 4B:
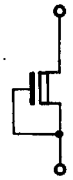
Figure 5:
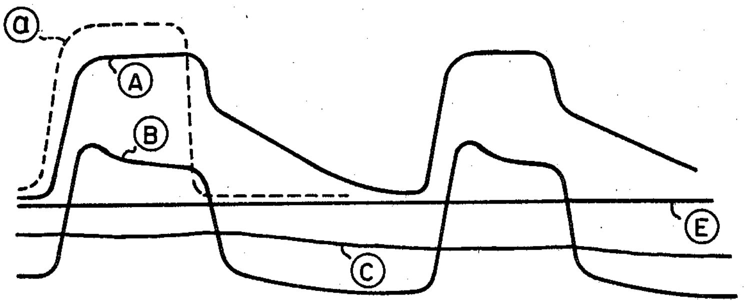
FIG. 5 is a diagram of wavforms in essential portions of the circuit shown in FIG. 4A.

FIG. 4A shows a fundamental embodiment of the circuit according to the present invention. The circuit is characterized by the provision of a constant current circuit 8 between MOS transistors $Q_1$ and $Q_2$ so as to limit the peak voltage caused by the current flowing in the capacitor 2 when the rectifier circuit of MOS transistor $Q_3$ is conducting, thereby preventing conductance of the diode 5. For a constant current circuit 8, a depletion type MOS transistor connected as shown in FIG. 4B can be used. FIG. 5 illustrates voltage waveforms at points A, B, C in FIG. 4A. In FIG. 5, "a" denotes an output waveform of the oscillator circuit 1.

Figure 6:
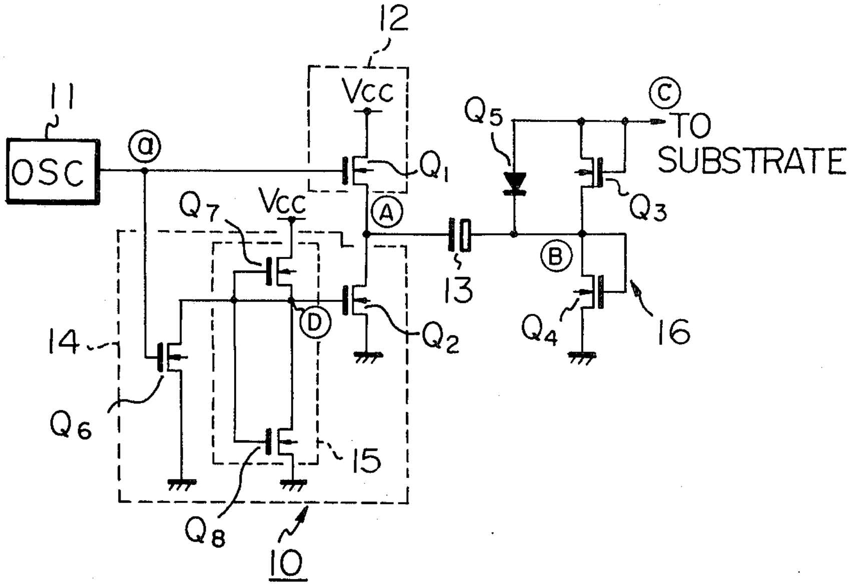
FIG. 6 is a block diagram of another embodiment of the circuit according to the present invention.

FIG. 6 illustrates a particular embodiment of the substrate-bias-voltage-generating circuit according to the present invention. In the circuit shown in FIG. 6, 11 denotes an oscillator circuit. The output of oscillator circuit 11 is supplied to a control input of a positive direction drive circuit 12 which is connected to one electrode of a capacitor or other charge-accumulating element 13. The above-mentioned one electrode of the capacitor 13 is further connected to a negative-direction drive circuit 14. A control input of the negative-direction drive circuit 14 is connected to the output of the oscillator circuit 11. A circuit 15 for limiting the negative-direction drive current is provided in the negative-direction drive circuit 14. Another electrode of the capacitor 13 is connected to a semiconductor rectifier circuit 16 formed in the semiconductor substrate. $Q_5$ denotes the junction diode formed when the rectifier circuit is formed in the semiconductor substrate. The junction diode has a unidirectional property from the substrate to which the output of the rectifier circuit 16 is connected toward another electrode to which the rectifier circuit 16 is connected.

The thus constructed substrate-bias-voltage-generating circuit 10 has a positive-direction drive circuit 12 with a gate connected to the output of the oscillator circuit 11, a drain connected to the power supply Vcc, and a source connected to one electrode of the capacitor 13.

In the negative-direction drive circuit 14, the drain of an enhancement-type N-channel FET $Q_6$, of which the gate is connected to the output of the oscillator circuit 11, is connected to the gate of an enhancement-type N-channel FET $Q_2$ via the constant current circuit or other circuit for limiting the negative-direction drive current 15; the drain of the transistor $Q_2$ is connected to one electrode of the capacitor 13, and the source of the transistor $Q_2$ is connected to ground potential or other reference potential. The source of the transistor $Q_6$ is also connected to ground potential.

The constant-current circuit 15 fundamentally comprises a depletion-type N-channel FET $Q_7$, with the gate and source connected to the gate of the transistor $Q_2$ and with the drain connected to the power supply Vcc, and an enhancement-type N-channel FET $Q_8$ with the gate and drain connected to the gate of the transistor $Q_2$ and with the source connected to ground potential. For conveience, the connection portion from the source of transistor $Q_7$ to the drain of transistor $Q_8$ is referred to as the constant-current flowing portion.

Rectifier circuit 16 comprises enhancement-type N-channel MOS FET's $Q_3$ and $Q_4$ connected in series across the substrate and ground potential. The gates of these transistors are connected to their corresponding drains.

Figure 7:
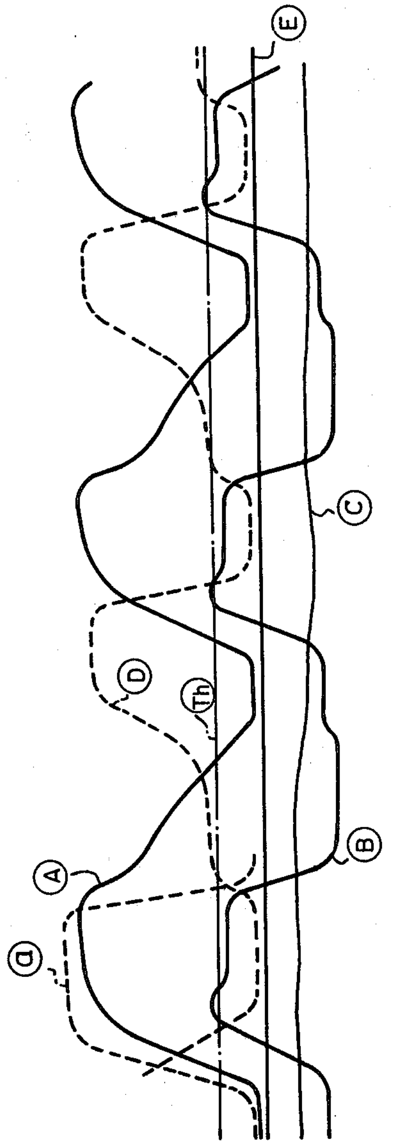
FIG. 7 is a diagram of waveforms in essential portions of the circuit shown in FIG. 6.

The operation of the thus constructed circuit of the invention will be described below. Pulses are supplied at a predetermined period from the oscillator circuit 11 to the positive-direction drive circuit 12 and to the negative-direction drive circuit 14, and the capacitor 13 is alternately driven to the positive direction and to the negative direction by circuits 12 and 14. Therefore, the average alternating current level of the other electrode C of the capacitor 13 becomes negative. FIG. 7 illustrates a time chart showing the relation of the output signal "a" of the oscillator circuit 11, an input voltage A of the capacitor 13, an output voltage B of the capacitor 13, the substrate bias voltage C, waveform D of the constant-current flowing portions, a threshold voltage Th of the transistor $Q_3$, and ground potential E.

As shown in FIG. 7, when the output signal "a" of the oscillator circuit 11 is shifted to a low level, the output current of the constant-current circuit 15 is determined by the potential at the constant-current flowing portion of the transistors $Q_7$, $Q_8$ and $Q_2$. The thus determined current is of a level either not allowing any current to flow into the junction diode or allowing only a current smaller than a predetermined value to flow through the substrate, transistor $Q_3$, capacitor 13, and transistor $Q_2$. Therefore, even though diode $Q_5$ is formed in parallel with transistor $Q_3$, injection of minority carriers to the semiconductor substrate via diode $Q_5$ can be prevented, whereby malfunctions of the peripheral circuits can be prevented.

Figure 8:
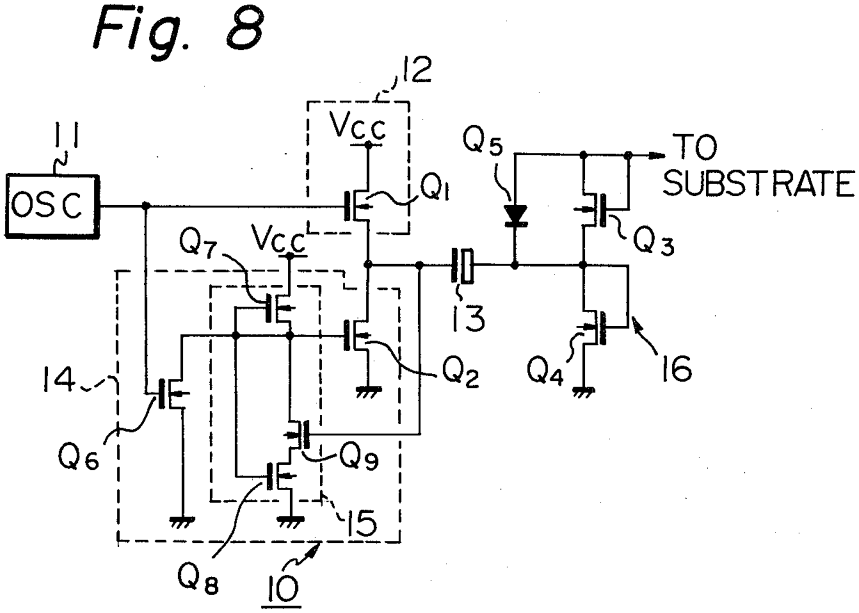
FIGS. 8, 9, 10, 11, and 12 are block diagrams of further embodiments of the circuit according to the present invention.

In FIG. 8, an enhancement type N channel FET $Q_9$ is further provided in the circuit shown in FIG. 6. The transistor $Q_9$ is provided between the gate of the transistor $Q_2$ and the drain of the transistor $Q_9$, and the gate of the transistor $Q_9$ is connected to the input terminal of the capacitor 13. Transistor $Q_9$ operates to raise the gate potential of transistor $Q_2$ in the negative direction, so that the conductivity of transistor $Q_2$ is increased and transistor $Q_2$ can complete the drive toward the negative direction.

Figure 9:
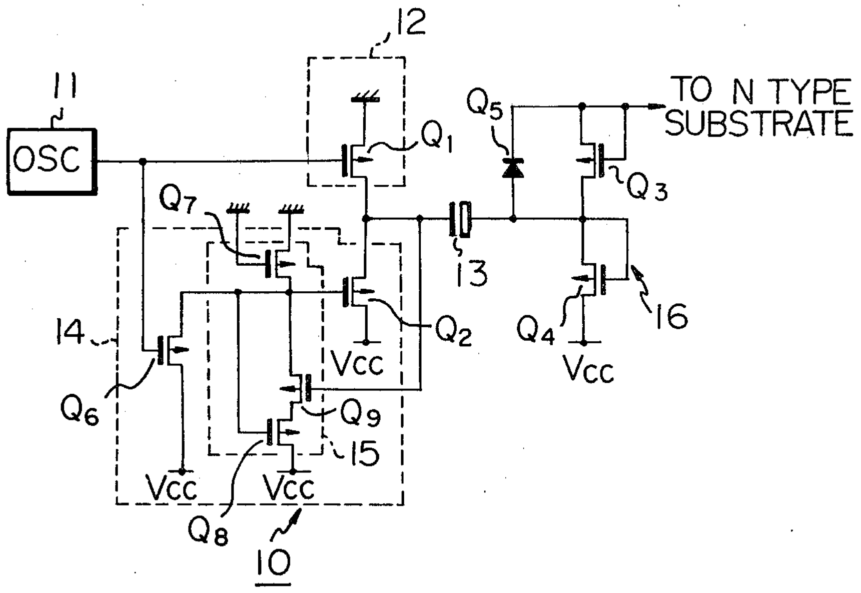

FIG. 9 is a circuit which uses transistors having opposite polarity with respect to those used in FIG. 8 and which forms in the n type semiconductor substrate of the substrate-bias-voltage-generating circuit. The circuit shown in FIG. 9 can give the same effects as that of FIG. 8.

The above-mentioned embodiment has dealt with the case when the circuit for limiting the negative-direction drive current is made up of a constant-current circuit which comprises transistors $Q_7$ and $Q_8$. However, there is no limitation on the circuit setup provided it is capable of maintaining the voltage which is applied to the gate of transistor $Q_2$ so that the above-mentioned conductivity is accomplished. Moreover, the circuit of the invention and the transistors may be those other than those of the type mentioned above.

Figure 10:
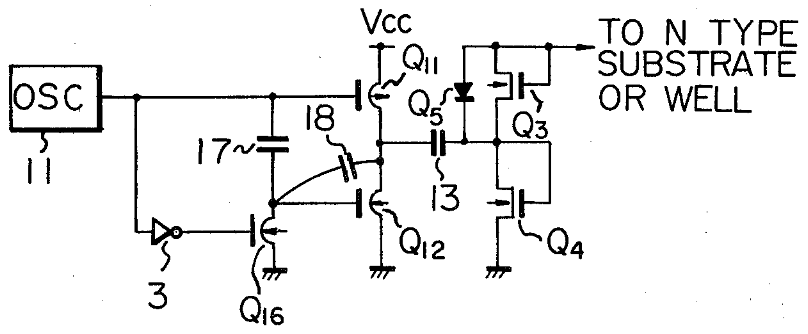
Figure 11:
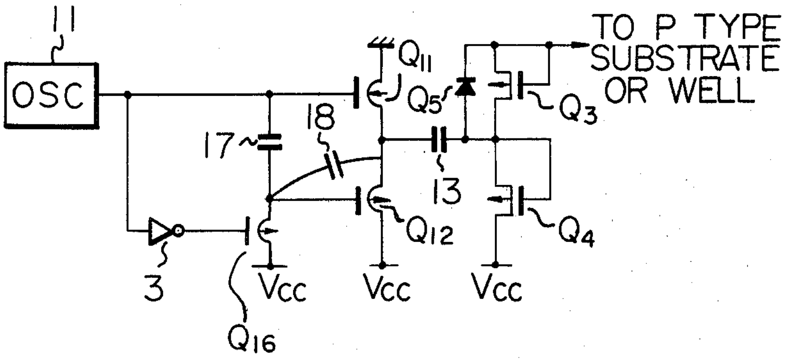

FIG. 10 illustrates the embodiment where the present invention is applied to a complimentary MOS circuit (CMOS circuit). In the circuit shown in FIG. 10, transistors $Q_{11}$ and $Q_{12}$ correspond to $Q_1$ and $Q_2$ in FIG. 8; transistor $Q_{16}$, correspond to $Q_6$, and capacitor 17 and 18 is used in place of transistor $Q_7$, and $Q_8$ and $Q_9$. FIG. 11 is an embodiment where a semiconductor substrate opposite to the embodiment shown in FIG. 10 is used. The circuits shown in FIGS. 10 and 11 can be formed with low energy consumption by using a CMOS circuit. The present invention as applied to a CMOS circuit, can prevent latch-up.

Figure 12:
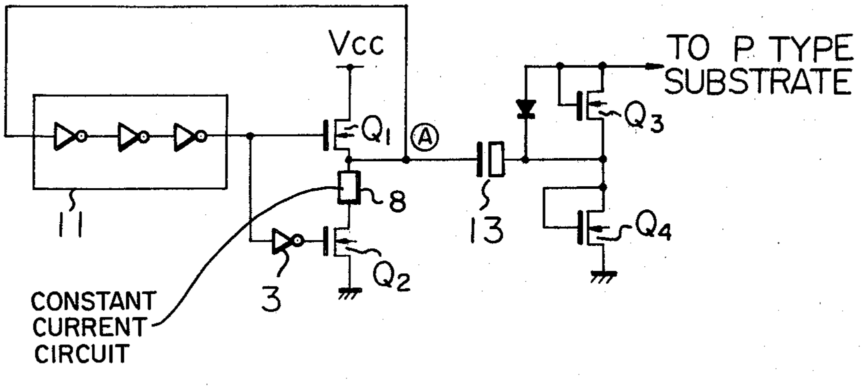

Further, in the present invention, the voltage waveform shown in A of FIG. 7 falls with a constant current, therefore the period in the low voltage level of the output a of the oscillator circuit 11 shown in FIG. 7 must be long. This can be accomplished by forming the oscillator circuit 11 such that it is controlled by the driver output shown in FIG. 7 B or such that feedback is applied from the output point A of the transistor $Q_1$, as shown in FIG. 12, to the oscillator circuit 11.

According to the present invention, as is obvious from the above description, the current which flows when the potential at one electrode of the capacitor 13 is driven toward the negative direction by the negative-direction drive circuit, is restricted to a value which does not permit the junction diode to pass current, the junction diode being formed together with the formation of the rectifier circuit. Therefore, the injection of minority carriers to the semiconductor substrate caused by the formation of the junction diode is eliminated. In forming the semiconductor rectifier circuit in the substrate, no attention is required toward the formation of the junction diode. The circuit of the present invention also exhibits merits possessed by the circuit of FIG. 1.

I claim:

1. A circuit for generating a substrate bias voltage in a semiconductor substrate, comprising:
- an oscillator circuit for generating a periodic signal;
- means for supplying a reference voltage level;
- a capacitor having first and second terminals;
- a first rectifier circuit operatively connected between the semiconductor substrate and the first terminal of said capacitor;
- a second rectifier circuit operatively connected between said reference voltage supply means and the first terminal of said capacitor; and
- a drive circuit, including a positive direction drive circuit, operatively connected between said oscillator circuit and the second terminal of said capacitor, for positively driving said second terminal of said capacitor, said drive circuit further including a negative direction drive circuit, operatively connected between said oscillator circuit and the second terminal of said capacitor, for inverting the periodic signal and for negatively driving said second terminal of said capacitor, said negative direction drive circuit including a current limiting circuit for limiting the peak value of the current in said capacitor when said first rectifier circuit is placed in a conductive state.

2. A circuit for generating a substrate bias voltage according to claim 1, wherein said positive direction drive circuit comprises:
- means for supplying a power source voltage; and
- a first field effect transistor (FET) having a source operatively connected to said second terminal of said capacitor, having a gate operatively connected to said oscillator circuit and having a drain operatively connected to said power source voltage supply means, wherein said negative direction drive circuit comprises:
- a second FET having a drain, having a source operatively connected to said reference voltage supply means and having a gate for receiving the inverted periodic signal, and wherein said current limiting circuit comprises:
- a depletion type FET operatively connected between the second terminal of said capacitor and said drain of said second FET.

3. A circuit for generating a substrate bias voltage according to claim 1, wherein said positive direction drive circuit comprises:
- a first FET having a gate operatively connected to said oscillator circuit, having a drain operatively connected to said power source voltage supply means and having a source operatively connected to said second terminal of said capacitor, wherein said negative direction drive circuit comprises:
- a second FET having a drain operatively connected to said second terminal of said capacitor, having a source operatively connected to said reference voltage supply means and having a gate operatively connected to said current limiting circuit; and
- a third FET, having a drain operatively connected to said gate of said second FET, having a source operatively connected to said reference voltage supply means and having a gate operatively connected to said oscillator circuit, and wherein said current limiting circuit comprises:
- means for controlling a bias voltage applied to said gate of said second FET in response to said periodic signal generated by said oscillator circuit.

4. A circuit for generating a substrate bias voltage according to claim 3, wherein said bias voltage controlling means comprises:
- fourth and fifth FETs operatively connected in series between said power source voltage supply means and said reference voltage supply means, said fourth and fifth FETs each having a gate operatively connected to said gate of said second FET, said fourth FET having a source operatively connected to said gate of said second FET, and said fifth FET having a drain operatively connected to said gate of said second FET.

5. A circuit for generating a substrate bias voltage according to claim 4, wherein said bias voltage controlling means further comprises a sixth FET operatively connected between said source of said fourth FET and said drain of said fifth FET, said sixth FET having a gate operatively connected to said second terminal of said capacitor.

6. A circuit for generating a substrate bias voltage according to claim 5, wherein said first and second transistors have opposite polarities.

7. A circuit for generating a substrate bias voltage according to claim 1, wherein said positive direction drive circuit comprises:

a P-channel FET having a gate operatively connected to said oscillator circuit, having a source operatively connected to said power source voltage supply means and having a drain operatively connected to said second terminal of said capacitor for receiving said periodic signal of said oscillator circuit, wherein said negative direction drive circuit comprises:

a first N-channel FET having a gate, having a source operatively connected to said reference voltage supply means and having a drain operatively connected to said second terminal of said capacitor, and wherein said current limiting circuit comprises:

a second N-channel FET operatively connected between said gate of said first N-channel FET and said reference voltage supply means, said second N-channel FET having a gate;

means, operatively connected between said oscillator circuit and said gate of said second N-channel FET, for inverting said periodic signal of said oscillator;

a first capacitor operatively connected between said gate of said P-channel FET and said gate of said first N-channel FET; and a second capacitor operatively connected between said gate and drain of said first N-channel FET.

8. A circuit for generating a substrate bias voltage according to claim 1, 2, 3 or 4, wherein said oscillator circuit includes a feedback circuit operatively connected to said second terminal of said capacitor.

9. A ciruit for generating a substrate bias voltage in a semiconductor substrate, comprising:

an oscillator circuit for generating a periodic signal;

an inverter, operatively connected to said oscillator circuit, for inverting said periodic signal;

a first transistor operatively connected to said oscillator circuit;

a second transistor operatively connected to said first transistor and said inverter;

a capacitor operatively connected to said first and second transistors;

a rectifier circuit operatively connected to the semiconductor substrate and said capacitor; and a current limiting circuit, operatively connected between said first and second transistors and operatively connected to said capacitor, for limiting the peak value of current in said capacitor when said rectifier circuit is in a conductive state.

* * * * *

UNITED STATES PATENT AND TRADEMARK OFFICE

CERTIFICATE OF CORRECTION

PATENT NO. : 4,454,571

DATED : JUNE 12, 1984

INVENTOR(S) : TAKUMI MIYASHITA

It is certified that error appears in the above-identified patent and that said Letters Patent is hereby corrected as shown below:

Col. 1, line 39, after "FET" insert --,--.

Col. 2, line 4, "valve" should be --value--;
line 22, "wavforms" should be --waveforms--.

Col. 3, line 7, "for" should be --form--.

Col. 5, line 12, "correspond" should be --corresponds--; and "capacitor" should be --capacitors--;
line 13, "is" should be --are--;
line 18, after "invention" insert --,--.

Signed and Sealed this

*Sixth* Day of *November 1984*

[SEAL]

*Attest:*

GERALD J. MOSSINGHOFF

*Attesting Officer*

*Commissioner of Patents and Trademarks*